United States Patent
Flock

(10) Patent No.: US 9,089,994 B2
(45) Date of Patent: Jul. 28, 2015

(54) DEVICE FOR CUTTING A SUBSTRATE AND METHOD FOR CONTROLLING SUCH A CUTTING DEVICE

(71) Applicant: Hilti Aktiengesellschaft, Schaan (LI)

(72) Inventor: Marcus Flock, Schuebelbach (DE)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 14/617,660

(22) Filed: Feb. 9, 2015

(65) Prior Publication Data

US 2015/0151451 A1 Jun. 4, 2015

Related U.S. Application Data

(63) Continuation of application No. 13/724,437, filed on Dec. 21, 2012, now abandoned.

(30) Foreign Application Priority Data

Dec. 23, 2011 (DE) .......................... 10 2011 089 878

(51) Int. Cl.
*B28D 1/04* (2006.01)
*B28D 1/10* (2006.01)

(52) U.S. Cl.
CPC ................ *B28D 1/044* (2013.01); *B28D 1/045* (2013.01); *B28D 1/10* (2013.01)

(58) Field of Classification Search
CPC .......... B28D 1/045; B28D 1/18; B28D 1/044; B28D 1/10
USPC ........ 299/1.05, 1.4, 1.5, 1.6, 39.1, 39.3, 41.1; 125/38; 451/347
See application file for complete search history.

(56) References Cited

U.S. PATENT DOCUMENTS

| | | | |
|---|---|---|---|
| 3,722,497 | A | 3/1973 | Hiestand et al. |
| 4,557,245 | A | 12/1985 | Bieri |
| 6,582,026 | B2 | 6/2003 | Bertrand |
| 7,337,037 | B2 | 2/2008 | Schaer et al. |
| 7,451,757 | B2 | 11/2008 | Ketterhagen et al. |
| 2007/0163412 | A1 | 7/2007 | Baratta et al. |
| 2008/0276773 | A1 | 11/2008 | Togare |
| 2011/0203565 | A1 | 8/2011 | Hilsgen et al. |
| 2011/0303060 | A1 | 12/2011 | Shima et al. |
| 2012/0234305 | A1 | 9/2012 | Jönsson |

FOREIGN PATENT DOCUMENTS

| | | |
|---|---|---|
| DE | 296 20 173 U1 | 3/1997 |
| DE | 11 2010 000 866 T5 | 11/2012 |
| EP | 1 693 170 A1 | 8/2006 |
| EP | 1 693 173 A1 | 8/2006 |
| WO | WO 2009/108093 A1 | 9/2009 |

OTHER PUBLICATIONS

European Search Report dated Apr. 12, 2013, (Six (6) pages).
German Search Report dated Dec. 10, 2012, (Five (5) pages).

*Primary Examiner* — David Bagnell
*Assistant Examiner* — Michael Goodwin
(74) *Attorney, Agent, or Firm* — Crowell & Moring LLP

(57) ABSTRACT

A device for cutting a substrate along a cutting line is disclosed. The device includes a saw unit with a saw blade, which can be rotated around an axis of rotation, a guide carriage for moving the saw unit along a guide rail, and a control device for controlling the saw unit and the guide carriage. A marking device is provided for marking an end point of the cutting line.

10 Claims, 5 Drawing Sheets

DEVICE FOR CUTTING A SUBSTRATE AND METHOD FOR CONTROLLING SUCH A CUTTING DEVICE

This application is a continuation of prior U.S. application Ser. No. 13/724,437, filed Dec. 21, 2012, which claims the priority of German Patent Document No. DE 10 2011 089 878.6, filed Dec. 23, 2011, the disclosures of which are expressly incorporated by reference herein.

BACKGROUND AND SUMMARY OF THE INVENTION

The present invention relates to a device for cutting a substrate along a cutting line as well as a method for controlling such a cutting device.

Devices for cutting a substrate along a cutting line are used, for example, to cut through reinforced and un-reinforced walls, ceilings and floors made of concrete or similar substrates by means of rotating saw blades. For example, it may be necessary in demolition, reconstruction or remodeling work to cut through or tear down already existing concrete walls or cut out areas of the concrete walls.

European Patent Document No. EP 1 693 173 discloses such a known device for cutting a substrate along a cutting line and a known method for controlling a cutting device for a machining process that is automated bit-by-bit. The cutting device includes a saw unit with a saw blade, which can be rotated around an axis of rotation, a guide carriage for moving the saw unit along a guide rail and a control device for controlling the saw unit and the guide carriage. The saw unit includes a saw head and a saw arm, on which the saw blade is mounted, and which can be pivoted around a pivot axis that is parallel to the axis of rotation of the saw blade. The control device is connected to a movement sensor, which determines the position of the saw unit along the guide rail, and a pivot angle sensor, which determines the pivot angle of the saw arm. A first and second end point of the cutting line, which represent the two turning points for the movement direction of the guide carriage, are input via an input means of the control device during the control method of the cutting device.

This disadvantage of the known device for cutting a substrate along a cutting line is that the operator must convert the end points of the cutting line to coordinates before he/she can input them into the control device. This conversion is prone to error.

Improving a device for cutting a substrate along a cutting line and a method for controlling such a cutting device with regard to the disadvantages described above would be desirable.

The object of the present invention is further developing a device for cutting a substrate along a cutting line to the effect that the operator marks an end point of the cutting line and the conversion of the lengths is handled by the control device. The object of the invention is also disclosing a corresponding method for controlling the cutting device.

According to the invention, a first marking device is provided, which marks the first end point of the cutting line. A second marking device is preferably provided, which marks a second end point of the cutting line. The operator is able to mark the end point or the end points of the cutting line with the aid of the marking devices and does not have to perform a conversion of lengths and coordinates. The operator is able to transfer the end points, which are marked by a laser instrument, without effort to the surface being machined.

In a preferred embodiment, the first and/or second marking device has an optical marking element, which optically marks the end point, a signal generator and a detector device, wherein the signal generator emits a position signal corresponding to the position of the end point or a position of a reference point, which is arranged at a defined distance from the end point, and the detector device receives the position signal of the signal generator. In this case, the detector device can especially preferably be connected to the control device and transmits information corresponding to the position signal of the signal generator to the control device. The structure of the marking devices made up of an optical marking element, a signal generator and a detector device makes an automatic control method possible.

In a preferred embodiment, the detector device of the first marking device and the detector device of the second marking device are configured as a common detector device. A common detector device for both marking devices reduces equipment costs.

The optical marking element of the first marking device and/or the second marking device can be moved on the guide rail by a movement device. The advantage of a moveable marking device is that the operator does not have to remove the marking device from the guide rail, but can move it along the guide rail. A mechanical end stop is preferably connected to the optical marking element of the first and/or second marking device.

Suitable as the signal generator and detector device are all common sensor systems for detecting objects. The detector device is, for example, configured as an inductive proximity switch, which detects an electrically conductive object. Alternatively, the detector device may be configured as a Hall sensor or cam switch.

In a preferred embodiment, the signal generator has a transmitting unit, which emits a measuring beam, and a measurement object, and the detector device has a receiving unit and an evaluation device. Especially preferably, the transmitting unit, the receiving unit and the evaluation device form a laser distance measuring system or an ultrasonic distance measuring system. It is possible to measure distances very precisely with the aid of laser and ultrasonic distance measuring systems.

The invention also relates to a method for controlling a cutting device, which cuts a substrate along a cutting line up to a first end point, in which a position signal, which corresponds to the position of the first end point, is generated by a signal generator and received by a detector device, information corresponding to the position signal is transmitted to the control device and the drive device is correspondingly controlled by the control device.

Exemplary embodiments of the invention are described in the following on the basis of the drawings. These drawings are not necessarily supposed to represent the exemplary embodiments to scale, rather the drawings are executed in a schematic and/or slightly distorted form when this is useful for explanatory purposes. Reference is made to the pertinent prior art with respect to additions to the teachings directly identifiable from the drawings. It must be taken into consideration in this case that a wide range of modifications and changes related to the form and detail of an embodiment may be undertaken without deviating from the general idea of the invention. The features of the invention disclosed in the description, the drawings, as well as in the claims, may be essential for the further development of the invention both separately as well as in any combination. Moreover, all combinations of at least two features disclosed in the description, the drawings and/or the claims fall within the scope of the invention. The general idea of the invention is not restricted to the exact form or detail of the preferred embodiment described and depicted in the following or restricted to a subject matter that would be limited as compared to the subject matter claimed in the claims. In the case of any dimensioning ranges given, values within the stated limits are also meant to be disclosed as limit values, and to be applicable at will and claimable. For the sake of simplicity, the same reference numbers are used in the following for identical or similar parts or parts having an identical or similar function.

DETAILED DESCRIPTION OF THE DRAWINGS

Figure 1:
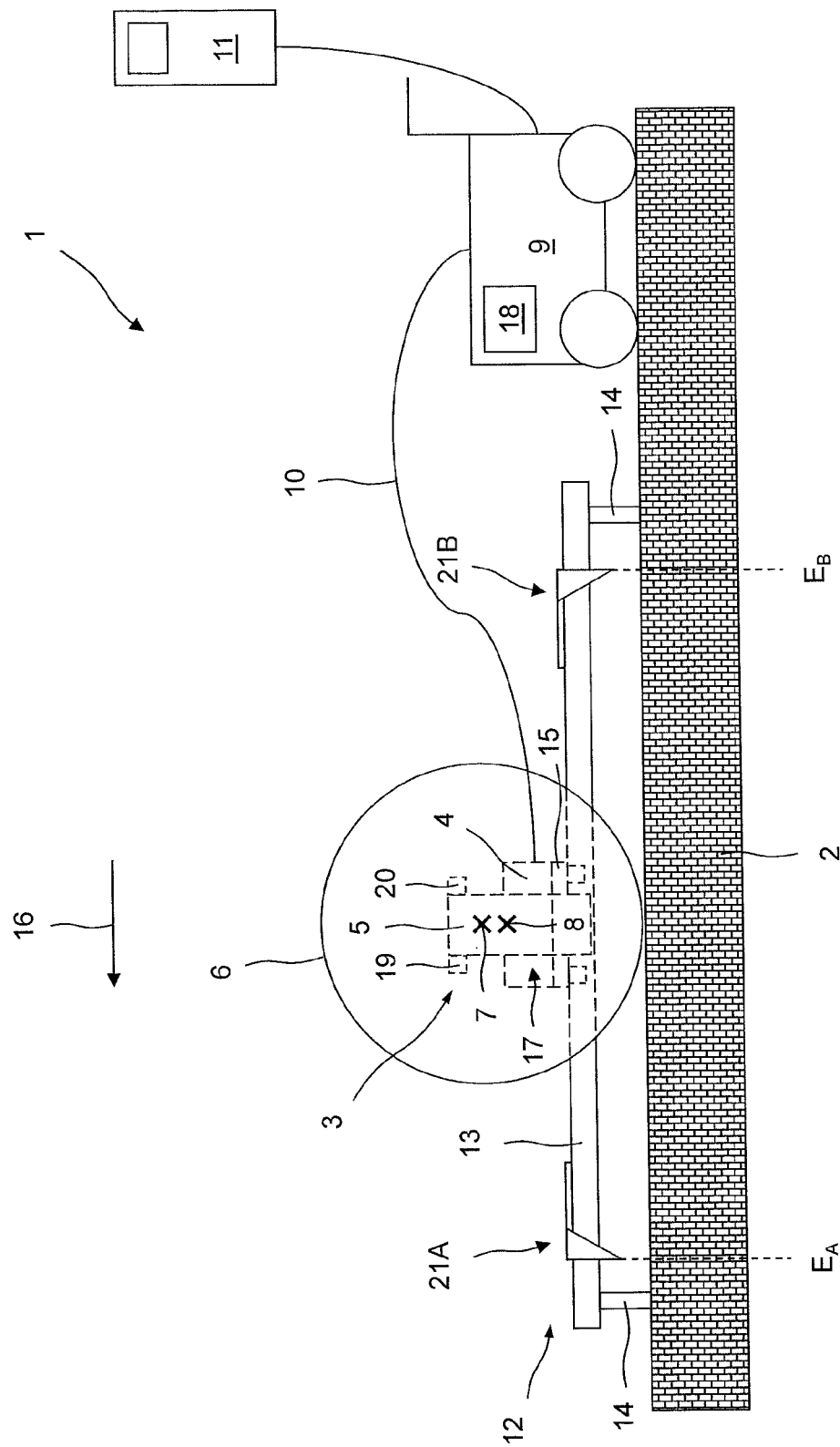
FIG. 1 is a schematic representation of a device according to the invention for cutting a substrate along a cutting line between a first and second end point, which are marked with a marking device.

FIG. 1 shows a schematic representation of a device 1 according to the invention for cutting a substrate 2 along a cutting line, which is limited by a first end point $E_A$ and a second end point $E_B$.

The cutting device 1 is configured as a wall saw and includes a saw unit 3 with a saw head 4 and a saw arm 5, on which a saw blade 6 is arranged. To protect the operator, the saw blade 6 is enclosed by a saw blade guard (not shown), which is arranged on the saw arm 5 by a blade guard bracket. During sawing operation, the saw blade 6 is driven around an axis of rotation 7 by a drive device arranged in the saw head 4. The saw arm 5 is configured to be pivotable around an axis of rotation 8. Along with the diameter of the saw blade 6, the pivot angle of the saw arm 5 determines how deep the saw blade 6 dips into the substrate 2 being machined. Alternatively, the saw arm 5 is configured to be adjustable by a linear drive or another drive device.

The electric or hydraulic supply of the saw unit 3 is accomplished via a supply device 9, in which all supply units are accommodated. The supply device 9 is connected to the saw unit 3 via a supply line 10, which includes all communications lines, electrical lines and other supply lines. The wall saw 1 is operated via an operating device 11, which is connected to the supply device 9 in the embodiment depicted shown in FIG. 1.

The supply units combined in the supply device 9 may also be fully or partially integrated into the saw unit 3 as an alternative. In the case of full integration of the supply units into the saw unit 3, the operating device 11 is connected directly to the saw unit 3; in the case of partial integration of the supply units into the saw unit 3, the operating device 11 may be connected to the supply device 9 and/or the saw unit 3.

The cutting device 1 also includes a fastening apparatus 12 made up of a guide rail 13 and rail bases 14, as well as a guidance device configured as a guide carriage 15. The guide rail 13 is fastened on the substrate 2 being machined by the rail bases 14. The saw unit 3 is arranged so that it can be moved longitudinally via the guide carriage 15 on the guide rail 13 in a feed direction 16 as well as in a direction opposite from the feed direction 16.

The saw unit 3 includes a first drive device for rotating the saw blade 6 around the axis of rotation 7 and a second drive device for feed movement of the guide carriage 15 along the guide rail 13. The first and second drive devices are configured as a common drive device 17 in the embodiment in FIG. 1; alternatively, they may be configured as separate drive devices in the saw unit 3. The drive device 17 is controlled via a control device 18, which is integrated into the supply device 9. Alternatively, the control device 18 is accommodated in the saw unit 3 or in the operating device 11 or the control device is subdivided into individual control devices, which are accommodated in the different devices of the wall saw 1.

The control device 18 of the saw unit 3 is connected to a displacement measuring device 19 for detecting the distance traveled and an angle measuring device 20 for detecting the pivot angle of the saw arm 5. The displacement measuring device 19 and the angle measuring device 20 are attached to the saw unit 3 in the embodiment in FIG. 1.

The cutting line is limited by the first end point $E_A$ and the second end point $E_B$. The operator marks the first end point $E_A$ by a first marking device 21A and the second end point $E_B$ by a second marking device 21B. The second marking device 21B is constructed in an analogous manner to the first marking device 21A, but arranged on the guide rail 13 in a mirror-inverted manner. The structure of the first and second marking devices 21A, 21B will be explained using the example of the first marking device 21A and applies analogously to the second marking device 21B.

Figure 2A:
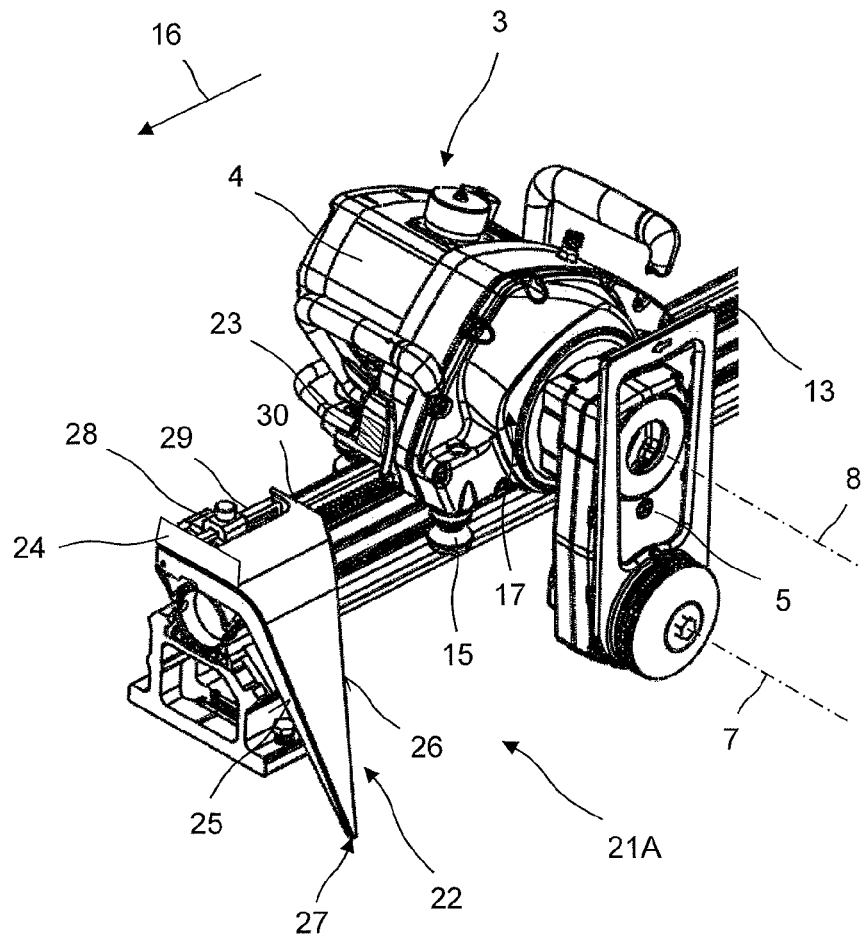
FIGS. 2A and 2B illustrate a first embodiment of the marking device with an optical marking element and a sensor device configured as a laser distance measuring system (FIG. 2A) and a block diagram showing the interaction of the laser distance measuring system with a measurement object (FIG. 2B)

FIG. 2A depicts an embodiment of the marking device 21A made up of an optical marking element 22, a sensor device 23 and a measurement object 24. The sensor device 23 is configured as a laser distance-measuring system, which is fastened on the saw head 4 of the saw unit 3. The measurement object 24 is configured as a reflecting and/or scattering surface and is arranged at the position of the end point $E_A$.

The optical marking element 22 is configured as a sheet metal part with a rear edge 25 and a front edge 26, which form an arrow tip 27. In this case, the rear edge 25 of the optical marking element 22 marks the end point $E_A$ of the cutting line. The optical marking element 22 is fastened to the guide rail 13 by a fastening apparatus 28. When the fastening apparatus 28 is disengaged, the optical marking element 22 can be moved along the guide rail 13 by a movement device 29.

The feed movement of the saw unit 3 along the guide rail 13 is limited for safety reasons by a mechanical end stop. The end stop prevents the saw unit 3 from moving along the guide rail 13 beyond the permissible operating range. An end stop 30 is integrated into the optical marking element 22. If the guide carriage 15 hits against the end stop 30 during the feed movement, the feed movement of the guide carriage 15 will be stopped. In order for the end stop 30 to be able to have an effect, the optical marking element 22 must be configured to be mechanically stable and be fastened securely on the guide rail 13 via the fastening apparatus 28.

Figure 2B:
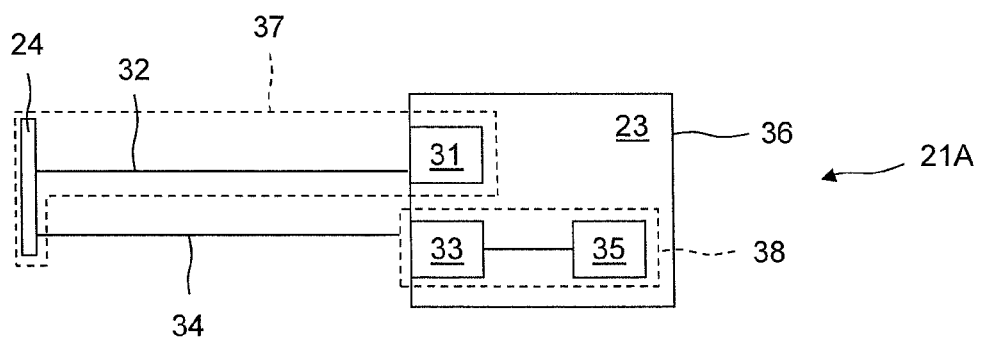

FIG. 2B depicts the interaction of the laser distance measuring system 23 and the measurement object 24 in the form a block diagram. The laser distance measuring system 23 includes a transmitting unit 31, which emits a laser beam 32; a receiving unit 33, which receives a laser beam 34 reflected and/or scattered from the measurement object 24, and an evaluation device 35, which is connected to the receiving unit 33 via a communication link. The evaluation device 35 calculates the difference between the actual position of the saw unit 3 to the end point $E_A$ of the cutting line, prepares a control command for controlling the feed movement of the drive device 17 from the difference and transmits the control command to the drive device 17 or to the corresponding control device 18. The measurement object 24 marks the end point $E_A$ of the cutting line or a reference point $R_A$, which is arranged at a known distance from the end point $E_A$.

The laser distance measuring system 23 is integrated into a housing 36, attached to the saw head 4 and configured to be movable with the guide carriage 15 along the guide rail 13. Alternatively, it is possible for the laser distance measuring system 23 to be integrated into the saw head 4, wherein it must be ensured that the laser beam 32 is able to strike the measurement object 24 in an unhindered manner. In this case, the evaluation device 35 may be integrated into the control device 18 of the saw unit 3 and be connected to the receiving unit 33 via a communication link.

The sensor device 23 and the measurement object 24 together form a signal generator 37 and a detector device 38. The signal generator 37 includes the transmitting unit 31 of the laser distance measuring system 23 and the measurement object 24, and the detector device 38 includes the receiving unit 33 and the evaluation device 35 of the laser distance measuring system 23.

Figure 3A:
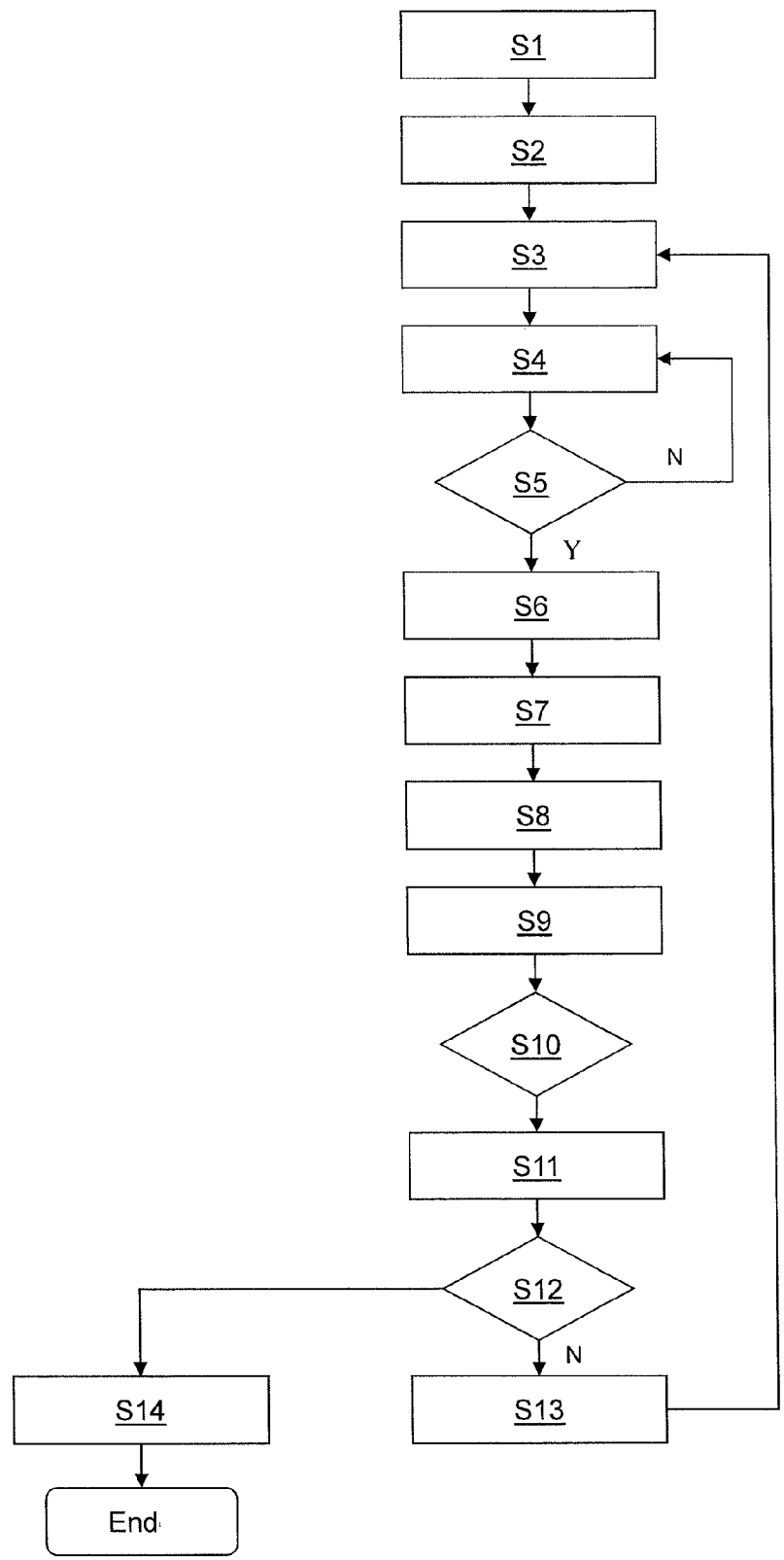
FIGS. 3A and 3B illustrate a method according to the invention for controlling a cutting device with the aid of the marking device in FIG. 2A (FIG. 3A) and a control loop, which is used to check the precision of the feed movement in the control method according to FIG. 3A (FIG. 3B)

FIG. 3A depicts a method according to the invention for controlling the wall saw 1 by the aid of the marking devices 21A, 21B. The control method is part of the machining method for cutting the substrate 2 along of the cutting line between the first end point $E_A$ and the second end point $E_B$. The machining method is subdivided into a preparation method and a control method.

The preparation method includes all preparatory steps that the operator carries out. The operator fastens the guide rail 13 on the substrate 2 to be machined by the rail bases 14 and suspends the saw unit 3 in any desired starting position in guide rail 13, wherein the starting position is arranged between the first end point $E_A$ and the second end point $E_B$ of the cutting line. The operator marks the first end point $E_A$ with the aid of the first marking device 21A and marks the second end point $E_B$ with the aid of the second marking device 21B. The optical marking elements of the first and second marking devices 21A, 21B are fastened to the guide rail 13 with the aid of the fastening apparatus 28.

The operator uses the operating device 11 to input various parameters, such as the diameter of the saw blade 6, the final cut depth of the cutting line and the maximum feed rate. The parameters are transmitted to the control device 18. The additional parameters that are required for an automatic control method are stored in the control device 18 or calculated by the control device 18 from the known parameters. During the preparation method, all required steps for the automatic control method are carried out, and missing parameters are determined so that the subsequent control method is carried out in an automatic manner without operator intervention.

During the control method, the saw blade 6 works into the substrate 2 being machined between the first end point $E_A$ and the second end point $E_B$ of the cutting line up to a final cut depth. Cutting the substrate 2 up to the final cut depth is carried out in one or more steps. The first cut is carried out in two parts when the starting position of the saw unit 3 is between the first end point $E_A$ and second end point $E_B$ of the cutting line, wherein, during the first part, the cutting line is generated between the starting point and the first end point $E_A$ in the feed direction 16 and, during the second part, the cutting line is generated between the starting point and the second end point $E_B$ against the feed direction 16. The additional cuts are carried out in an alternating manner between the first end point $E_A$ and the second end point $E_B$ in the feed direction 16 and against the feed direction 16. The control device 18 establishes the cut depths of the individual cuts and determines the pivot angle of the saw arm 5 corresponding to the cut depths.

In a Step S1, the operator starts the control method via the operating device 11. In a Step S2, the saw arm 5 is moved by the drive device 17 into the position corresponding to the pivot angle of the first cut first, wherein the saw arm 5 is preferably arranged in a pulling position. In a Step S3, the transmitting unit 31 and the receiving unit 33 of the laser distance measuring system 23 are activated by the control device 18, and in a step S4, the saw unit 3 is moved along the guide rail 13 with the aid of the drive device 17. In the case that the laser distance measuring system 23 is always activated, Step S3 may be dispensed with or be replaced by a control loop, in which the control device 18 checks to see whether the laser distance measuring system 23 is activated.

In a step S5, a check is made to see whether the receiving unit 33 has received a position signal. If the receiving unit 33 did not receive a position signal (N in S5), the method is continued with Step S4. If the receiving unit 33 did receive a position signal (Y in S5), in a step S6, the receiving unit 33 transmits information corresponding to the position signal to the evaluation device 35. In a Step S7, the evaluation device 35 calculates from the position signal the distance of the actual position from the first end point $E_A$ of the cutting line and, in a step S8, issues a control command to the drive device 17 to move the saw unit 3 along the guide rail 13 by the calculated distance. In a step S9, the control device 18 starts measuring the distance that the guide carriage 15 is moved along the guide rail 13 with the aid of the displacement measuring device 19.

In a step S10, the distance calculated in Step S7 is compared to the distance measured by the displacement measuring device 19, and a check is made to see whether the measured distance corresponds to the distance calculated from the position signal. If the distance measured by the displacement measuring device 19 falls short of the calculated distance (N in S10), the method continues with Step S10. If the measured distance corresponds to the calculated distance (Y in S10), in a step S11, the feed movement of the saw unit 3 ends.

At the end of the cut, the control device 18 checks in a step S12 whether the final cut depth of the cutting line has been reached. If the final cut depth of the cutting line has not be reached (N in S12), in a step S13, the saw unit 3 is moved by the drive device 17 by a length difference into a position which corresponds to the associated pivot angle of the saw arm 5, and the saw arm 5 is pivoted into the position corresponding to the pivot angle. The direction of movement is switched and the saw arm 5 is preferably arranged in the pulling position again. The pivot angle and the length difference are coordinated with each other in such a way that the end of the saw blade 6 coincides with the end point of the cutting line. After Step S13, the method continues with Step S3. Once the final cut depth of the cutting line has been reached (Y in S12), in a step S14, the saw arm 5 is pivoted out of the substrate 2 and moved into the initial position or a predefined position. After Step S14, the method according to the invention is ended.

Figure 3B:
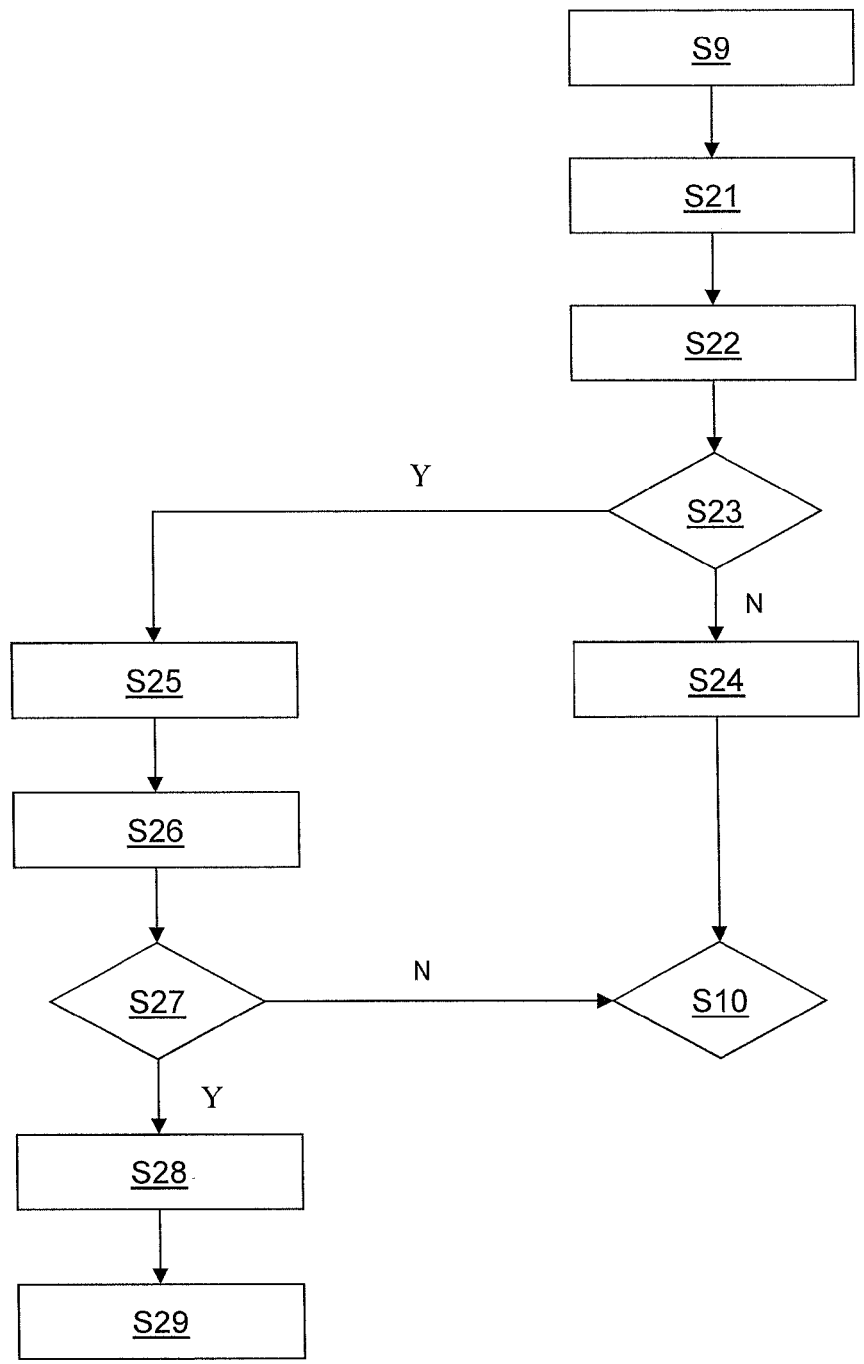

In a further development, the laser distance measuring system 23 offers the possibility of checking the precision of the feed movement and increasing it if need be. FIG. 3B depicts a control loop which may be carried out in the method from FIG. 3A between the steps S9 and S10.

In a step S21, the control device 18 activates the transmitting unit 31 and the receiving unit 33 of the laser distance measuring system 23. In a step S22, the transmitting unit 31 emits a further laser beam 32 at the measurement object 24 at the command of the control device 18. In a step S23, a check is made to see whether the receiving unit 33 has received a further position signal. If the receiving unit 33 did not receive a further position signal (N in S23), the saw unit 3 is moved in a step S24 by the distance determined from the position signal, and the method continues with Step S10.

If the receiving unit 33 has received a further position signal (Y in S23), in a step S25, the receiving unit 33 transmits information corresponding to a further position signal to the evaluation device 35, which, in a step S26, determines the distance of the current actual position from the first end point $E_A$. In a step S27, the distance determined from the further position signal is compared to the distance which is yielded as the difference from the first distance and the distance measured by the displacement measuring device 19, and a check is made to see whether a preset deviation was exceeded. If the preset deviation was not exceeded (N in S27), the method continues with Step S10. If the present deviation has been exceeded (Y in S27), the control device 18 issues a control command in a step S28 to the drive device 17 to move the saw unit 3 by the distance determined from the further position signal. The drive device 17 moves the saw unit 3 by the new distance in a step S29.

Figure 4:
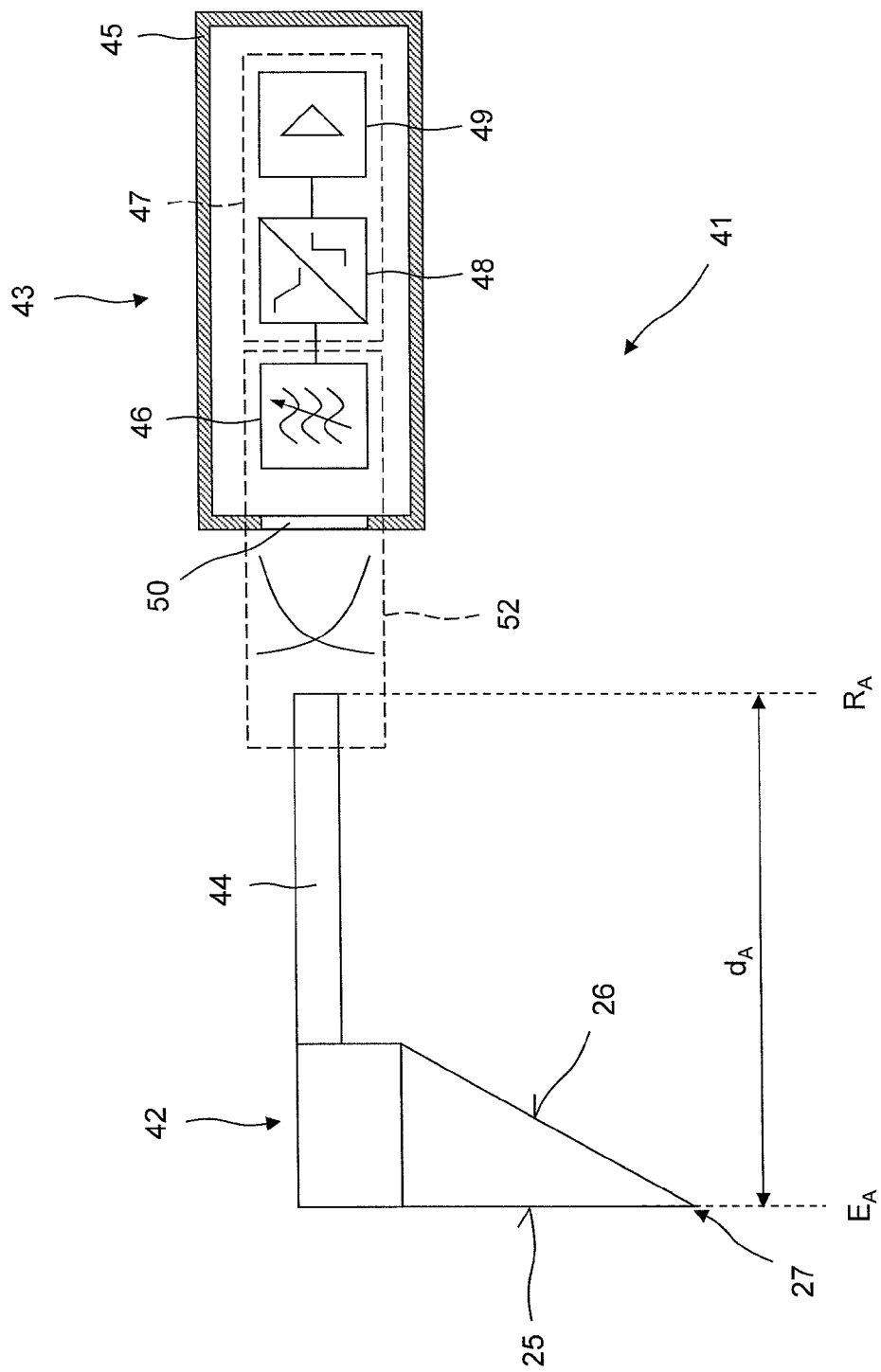
FIG. 4 illustrates a second embodiment of the marking device with an optical marking element and a sensor device configured as an inductive proximity switch.

FIG. 4 shows another embodiment of a marking device 41 made up of an optical marking element 42, a sensor device 43 and a measurement object 44. Analogous to the optical marking element 22 in FIG. 2A, the optical marking element 42 is configured as a sheet-metal part with the rear edge 25, the front edge 26 and the arrow tip 27 and optically marks the end point $E_A$ of the cutting line to the operator.

The sensor device 43 is configured as an inductive proximity switch. The inductive proximity switch 43 is made of a housing 45, an oscillator 46 and an electronic unit 47, which includes a flip-flop 48 and an amplifier 49. The oscillator 46 generates a high-frequency alternating field, which exits from the housing 45 of the inductive proximity switch 43 at an active surface 50.

The measurement object 44 is configured to be rod-shaped and is made of an electrically conductive material such as steel, copper or aluminum. The measurement object 44 is connected on a first end to the optical marking element 42. A second end of the measurement object 44 marks a reference point $R_A$, which has a known distance $d_A$ to the end point $E_A$ of the cutting line. The distance $d_A$ of the reference point $R_A$ from the end point $E_A$ is saved in the control device 18.

If the electrically conductive measurement object 44 enters the alternating field of the oscillator 46, an induction eddy voltage is generated in the measurement object 44, and an eddy current flows. Because of the eddy current, energy is withdrawn from the oscillator 46, which leads to a reduction in the vibrational amplitude of the oscillator 46. The reduction in the vibrational amplitude is evaluated in the electronic unit 47 and converted into a unique switching signal.

The sensor device 43 and the measurement object 44 together form a signal generator 52 and a detector device, which cooperates with the signal generator 52. The oscillator 46 and the electrically conductive measurement object 44 form the signal generator 52, which generates a position signal corresponding to the position of the reference point $R_A$.

The detector device is made of the electronic unit 47. The detector device receives the position signal and carries out an evaluation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for cutting a substrate along a cutting line, comprising:
    a saw unit with a saw blade, wherein the saw blade is rotatable around an axis of rotation;
    a guide carriage, wherein the saw unit is movable by the guide carriage along a guide rail;
    a control device, wherein the saw unit and the guide carriage are controllable by the control device; and
    a marking device associated with the guide rail, wherein an end point of the cutting line is markable by the marking device;
    wherein the marking device has an optical marking element, a signal generator, and a detector device, wherein the end point is optically markable by the optical marking element, wherein a position signal corresponding to a position of the end point or a position of a reference point which is arranged at a defined distance from the end point is emittable by the signal generator, and wherein the position signal is receivable by the detector device.

2. The device according to claim 1, further comprising a second marking device associated with the guide rail, wherein a second end point of the cutting line is markable by the second marking device.

3. The device according to claim 2, wherein the marking device and the second marking device have a common detector device.

4. The device according to claim 1, wherein the detector device is connectable to the control device and wherein information corresponding to the position signal is transmittable to the control device by the detector device.

5. The device according to claim 1, wherein the optical marking element is movable on the guide rail by a movement device.

6. The device according to claim 1, further comprising a mechanical end stop connected to the optical marking element.

7. The device according to claim 1:
    wherein the signal generator has a transmitting unit, wherein a measuring beam is transmittable by the transmitting unit, and a measurement object;
    and wherein the detector device has a receiving unit and an evaluation device.

8. The device according to claim 7, wherein the transmitting unit, the receiving unit, and the evaluation device form a laser distance measuring system or an ultrasonic distance measuring system.

9. A method for controlling a cutting device, comprising the steps of:
    generating a position signal by a signal generator which includes a measurement object, wherein the position signal corresponds to a position of an end point of a cutting line on a substrate and wherein the measurement object is arranged at the position of the end point or at a position of a reference point which is arranged at a defined distance from the end point;

receiving the position signal by a detector device, wherein the position signal is reflected and/or scattered from the measurement object;

transmitting information corresponding to the position signal to a control device by the detector device; and controlling a drive device of the cutting device by the control device based on the transmitted information.

10. The method according to claim 9:

wherein the signal generator further includes a transmitting unit;

and wherein the detector device has a receiving unit and an evaluation device.

\* \* \* \* \*